(12) United States Patent
Yang et al.

(10) Patent No.: US 9,070,521 B2
(45) Date of Patent: Jun. 30, 2015

(54) CIRCUIT BREAKER

(71) Applicant: LSIS CO., LTD., Anyang-si, Gyeonggi-do (KR)

(72) Inventors: Seung Pil Yang, Cheongju-si (KR); Hong Ik Yang, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 119 days.

(21) Appl. No.: 13/919,807

(22) Filed: Jun. 17, 2013

(65) Prior Publication Data
US 2014/0027408 A1    Jan. 30, 2014

(30) Foreign Application Priority Data
Jul. 26, 2012    (KR) .......................... 10-2012-0081941

(51) Int. Cl.
*H01H 1/38*    (2006.01)
*H01H 33/66*    (2006.01)
*H02B 1/56*    (2006.01)
*H02B 11/04*    (2006.01)

(52) U.S. Cl.
CPC ........... *H01H 33/66* (2013.01); *H01H 33/6606* (2013.01); *H02B 1/56* (2013.01); *H02B 11/04* (2013.01); *H01H 2033/6613* (2013.01)

(58) Field of Classification Search
CPC ....... H01H 33/6606; H01H 1/38; H01H 1/50; H01H 2033/6648; H01H 33/66
USPC ........................ 218/118–119, 129, 140, 150
See application file for complete search history.

(56) References Cited

U.S. PATENT DOCUMENTS 3,621,339 A    11/1971    Hodgson
3,925,599 A *  12/1975    Cleaveland ................. 174/150
(Continued)

FOREIGN PATENT DOCUMENTS

| CN | 1160751 | 8/2004 |
| EP | 0058519 | 8/1982 |
| KR | 2009-0085975 | 8/2009 |
| KR | 10-1158652 | 6/2012 |

OTHER PUBLICATIONS

Korean Intellectual Property Office Application Serial No. 10-2012-0081941, Office Action dated Jun. 28, 2013, 3 pages.

(Continued)

*Primary Examiner* — Truc Nguyen
(74) *Attorney, Agent, or Firm* — Lee, Hong, Degerman, Kang & Waimey (57) ABSTRACT

A circuit breaker according to the present disclosure includes a cradle having an accommodation space therein, the cradle having a plurality of terminals and a breaker main body having a plurality of terminal connectors contactable with the terminals, respectively, and a plurality of vacuum interrupters connected to the terminal connectors, respectively, the breaker main body being installed within the cradle to be movable between a connected position where the terminal connectors are connected to the terminals and a disconnected position where the terminal connectors are separated from the terminals. Each of the terminal connectors includes a plurality of segment conductors each having one end connected to the vacuum interrupter and the other end facing the terminal. According to the configuration, an amount of heat radiated may increase without an increase in an amount of copper used, thereby facilitating for cooling the terminal connectors.

14 Claims, 11 Drawing Sheets

(56) References Cited

U.S. PATENT DOCUMENTS

| | | | | |
|---|---|---|---|---|
| 4,012,609 | A | * | 3/1977 | Cleaveland ............... 200/50.27 |
| 5,387,771 | A | * | 2/1995 | Luehring ..................... 218/129 |
| 7,829,814 | B2 | * | 11/2010 | Marchand et al. ........... 218/140 |
| 2012/0199556 | A1 | * | 8/2012 | Yang et al. ................... 218/118 |

OTHER PUBLICATIONS

The State Intellectual Property Office of the People's Republic of China Application Serial No. 201310314124.2, Office Action dated Apr. 3, 2015, 7 pages.

* cited by examiner

CIRCUIT BREAKER

CROSS-REFERENCE TO RELATED APPLICATION

Pursuant to 35 U.S.C. §119(a), this application claims the benefit of earlier filing date and right of priority to Korean Application No. 10-2012-0081941, filed on Jul. 26, 2012, the contents of which is incorporated by reference herein in its entirety.

BACKGROUND OF THE INVENTION

1. Field of the Invention

This specification relates to a circuit breaker, and particularly, to a circuit breaker capable of increasing an amount of heat radiated without an increase in an amount of copper used.

2. Background of the Invention

In general, a circuit breaker is an apparatus for opening and closing a normal load of a circuit and blocking a fault current. For example, a vacuum circuit breaker may open and close a circuit and rapidly break a circuit by extinguishing arc, which is generated when blocking a fault current, within a vacuum interrupter. The vacuum circuit breaker may be installed together with a distributing board (switchboard), in which various electric devices including a breaker are placed and managed for operation or control of an electric power station and a substation, an operation of a motor and the like.

Figure 1:
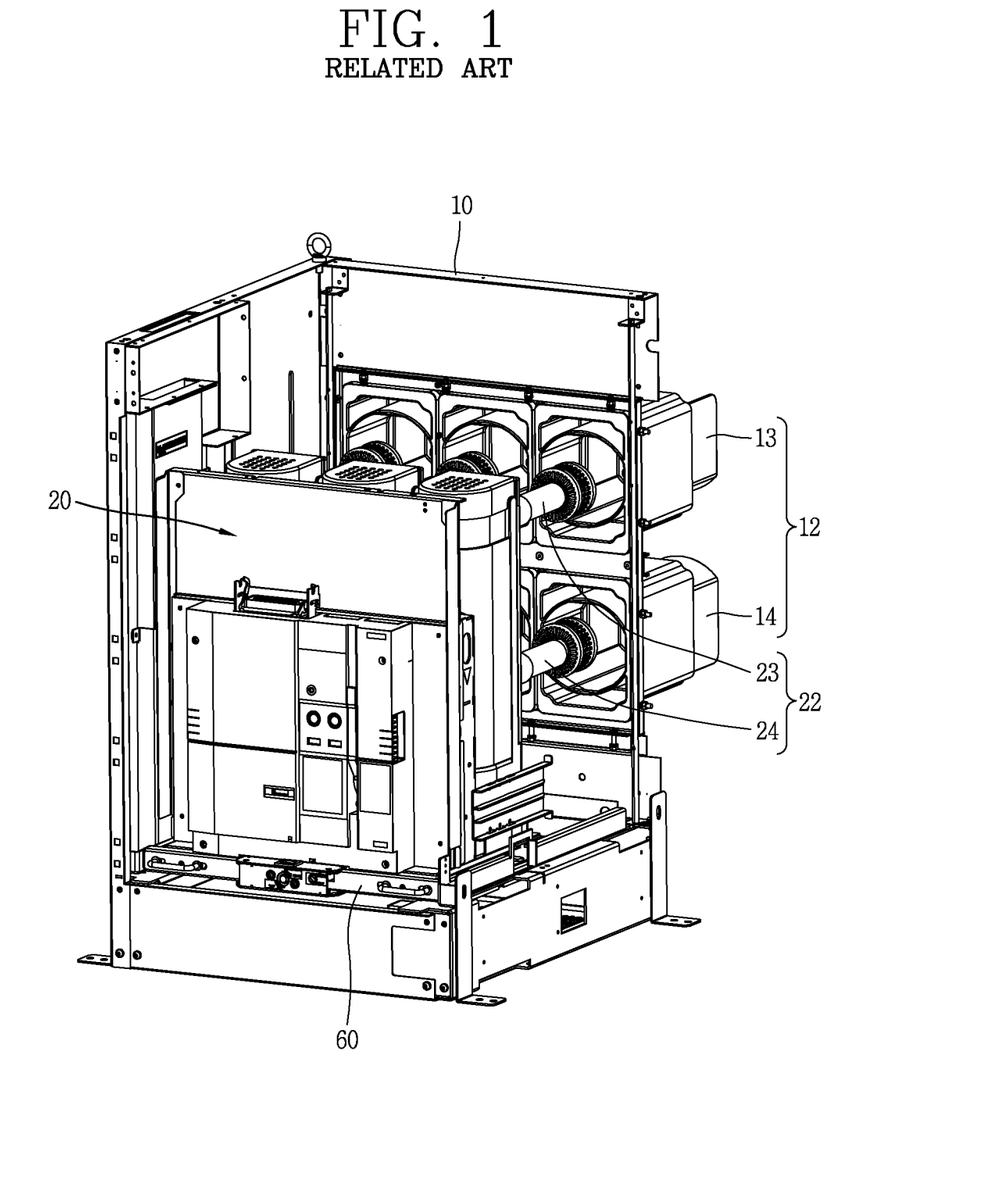
FIG. 1 is a perspective view showing an inside of a circuit breaker according to the related art.
Figure 2:
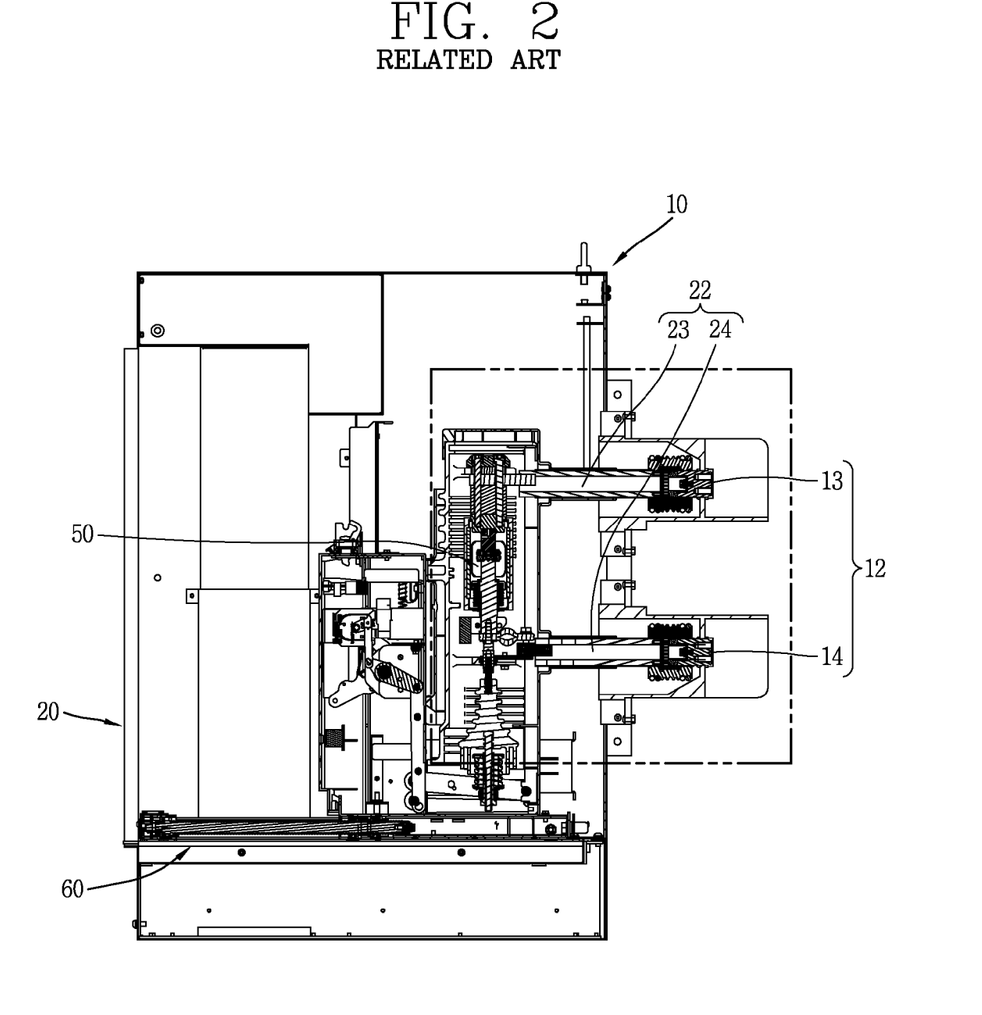
FIG. 2 is a sectional view of FIG. 1.
Figure 3:
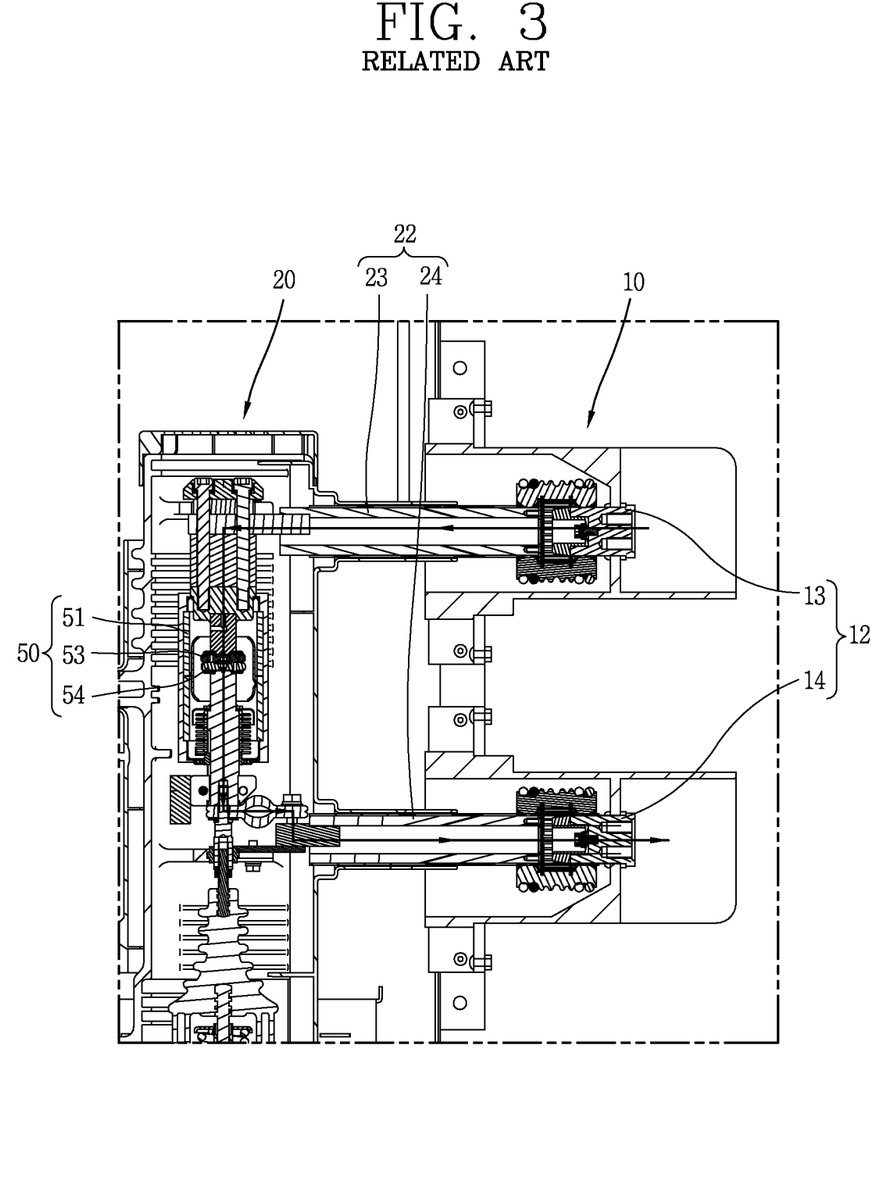
FIG. 3 is an enlarged view showing a current carrying path when the circuit breaker of FIG. 2 is connected.
Figure 4:
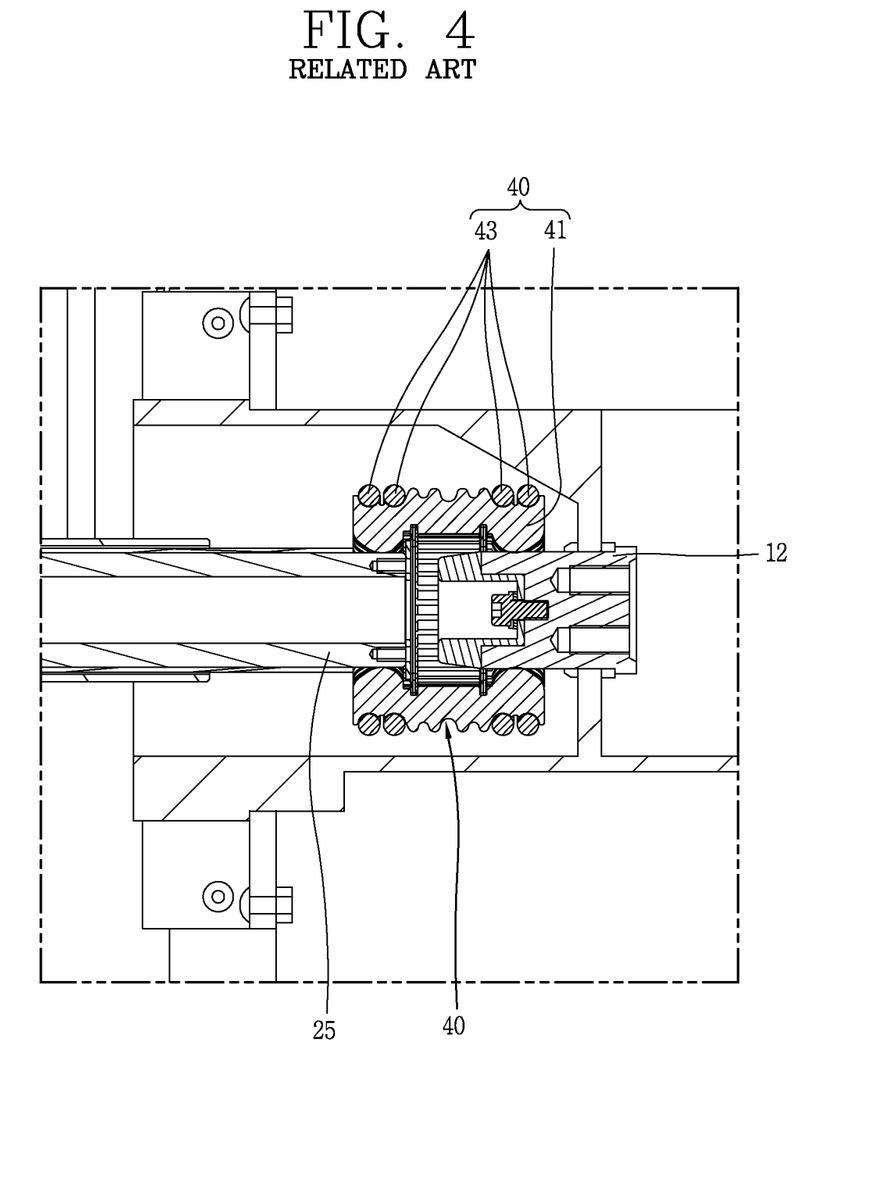
FIG. 4 is an enlarged view showing a main part of FIG. 3.

FIG. 1 is a perspective view showing an inside of a circuit breaker according to the related art, FIG. 2 is a sectional view of FIG. 1, FIG. 3 is an enlarged view showing a current carrying path when the circuit breaker of FIG. 2 is connected, and FIG. 4 is an enlarged view showing a main part of FIG. 3.

As shown in FIGS. 1 to 4, a circuit breaker according to the related art may include a cradle 10 having a plurality of terminals 12, and a breaker main body 20 having a plurality of terminal connectors connected to the terminals 12.

The plurality of terminals 12 may be disposed at a rear area of the cradle 10 in a moving direction of the breaker main body 20.

The terminals 12 may be provided per each phase (for example, U-phase, V-phase, W-phase) of an electric power source.

Each phase-based terminal 12 may include an upper terminal 13 and a lower terminal 14 connectable to a bus and a load, respectively, and spaced from each other in up and down directions.

The breaker main body 20 may include a plurality of terminal connectors 22 connected to the respective terminals 12, and a plurality of vacuum interrupters 50 connected to the phase-based terminal connectors 22, respectively, to open and close an electric power source.

A conveyer 60 which allows the breaker main body 20 to be relatively movable with respect to the cradle 10 may be disposed on a lower side of the breaker main body 20.

The conveyer 60 may be movable between a connected position that each terminal connector 22 is connected to the terminal 12 and a disconnected position that each terminal connector 12 is disconnected from the terminal 12.

Each of the vacuum interrupters 50 may include a vacuum container 51, a fixed contactor 53 fixed to the vacuum container 51, and a movable contactor 54 placed to be contactable with and separated from the fixed contactor 53.

Each of the terminal connectors 22 may include a conductor 25 having one end connected to the vacuum interrupter 50, and a contact member 40 located on the other end of the conductor 25 to be connected to the terminal 12 at the connected position of the breaker main body 20. Each conductor 25 may have a shape of rod having a circular or rectangular section.

Each contact member 40, as shown in FIG. 4, may include a plurality of fingers 41 radially disposed on the same circumference, and a plurality of spring members 43 disposed on a periphery of each finger 41 to inwardly press the finger 41 along a radial direction.

With the configuration, when the breaker main body 20 moves to the connected position, the terminal 12 of the cradle 10 may be inserted into the contact member 40 of each terminal connector 22. Accordingly, as shown in FIG. 3, electric power of the upper terminal 12 of the cradle 10 may be applied to the lower terminal 14 sequentially via the upper terminal connector 22, the vacuum interrupter 50 and the lower terminal connector 22.

In the meantime, at the connected position of the breaker main body 20, when a current starts to flow as the terminal 12 and the terminal connector 22 are connected to each other, heat may be generated on a current carrying path. Especially, an amount of heat generated on a contact area between the conductor 25 and the contact member 40 and between the fixed contactor 53 and the movable contactor 54 of the vacuum interrupter 50 may relatively increase. Here, since one end of each terminal connector 22 is connected to the contact member 40 and the other end thereof is connected (contactable) with the vacuum interrupter 50, relatively high heat may be generated.

However, in the related art circuit breaker, since the conductor 25 of each terminal connector 22 has a cylindrical shape or a polygonal shape, it has a relatively small surface area as compared with an amount of current (amount of heat generated). This may cause an insufficient exchange between heat and air (an insufficient amount of heat radiated in the air), resulting in an excessive increase in temperature of each terminal connector 22. In consideration of this problem, when a diameter or width of the conductor 25 increases, an amount of copper used may increase. This may cause an increase in a fabricating cost. With the increase in the amount of copper, an overall weight of the circuit breaker may increase and a conveying cost and/or installation cost may increase accordingly.

SUMMARY OF THE INVENTION

Therefore, to solve the drawbacks of the related art, an aspect of the detailed description is to provide a circuit breaker capable of increasing an amount of heat radiated without increasing an amount of copper used.

Another aspect of the detailed description is to provide a circuit breaker capable of increasing a heat exchange area with air and facilitating an installation.

To achieve these and other advantages and in accordance with the purpose of this specification, as embodied and broadly described herein, there is provided a circuit breaker including a cradle having an accommodation space therein, the cradle having a plurality of terminals, and a breaker main body having a plurality of terminal connectors contactable with the terminals, respectively, and a plurality of vacuum interrupters connected to the terminal connectors, respectively, the breaker main body being installed within the cradle to be movable between a connected position where the terminal connectors are connected to the terminals and a disconnected position where the terminal connectors are separated from the terminals. Here, each of the terminal connectors may include a plurality of segment conductors each having one end connected to the vacuum interrupter and the other end facing the terminal.

Here, each of the terminal connectors may further include a contact member connected to the other end of the segment conductor to allow for a current flow, and connected to the terminal at the connected position of the breaker main body.

Each of the terminal connectors may further include a coupling conductor simultaneously coupled to the other end of the segment conductor and having a periphery coupled with the contact member.

The coupling conductor may include a body, and a plurality of coupling portions formed on one side of the body to be connected to an end portion of each segment conductor.

The coupling conductor may include a contact member coupling portion to allow the contact member to be coupled to the other side of the body.

The contact member coupling portion may have a circular section.

The contact member coupling portion may be provided with a recess recessed into the contact member coupling portion in a radial direction and extending along a circumferential direction of the contact member coupling portion.

The circuit breaker may further include a connection conductor located between the vacuum interrupter and the segment conductors.

The connection conductor may be formed in a shape of plate to be contactable simultaneously with each segment conductor.

Each of the segment conductors may be disposed such that a section of the segment conductor has a vertical length longer than a horizontal width.

The segment conductors may be spaced from each other in the horizontal widthwise direction such that air flows therethrough.

The cradle may have an air outlet through which air within the cradle is discharged.

The air outlet may be located above the terminals.

The cradle may include an air inlet through which air is introduced.

The air inlet may be located below the terminals.

The cradle may include an air outlet located above the terminals such that air within the accommodation space is discharged out, and an air inlet located below the terminals such that air is introduced into the accommodation space.

In accordance with another exemplary embodiment, there is provided a circuit breaker including a cradle having an accommodation space therein, the cradle having a plurality of terminals, and a breaker main body having a plurality of terminal connectors contactable with the respective terminals, and a plurality of vacuum interrupters connected to the respective terminal connectors, the breaker main body being installed within the cradle to be movable between a connected position where the terminal connectors are connected to the terminals and a disconnected position where the terminal connectors are separated from the terminals. Here, each of the terminal connectors may include a plurality of segment conductors each having one end connected to the vacuum interrupter and the other end facing the terminal, and a contact member connected to the other end of each segment conductor to allow for a current flow and connected to the terminal at the connected position of the breaker main body. The cradle may include an air outlet located above the terminal such that air within the accommodation space is discharged out, and an air inlet located below the terminal such that air is introduced into the accommodation space.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a circuit breaker according to the exemplary embodiments, with reference to the accompanying drawings.

Figure 5:
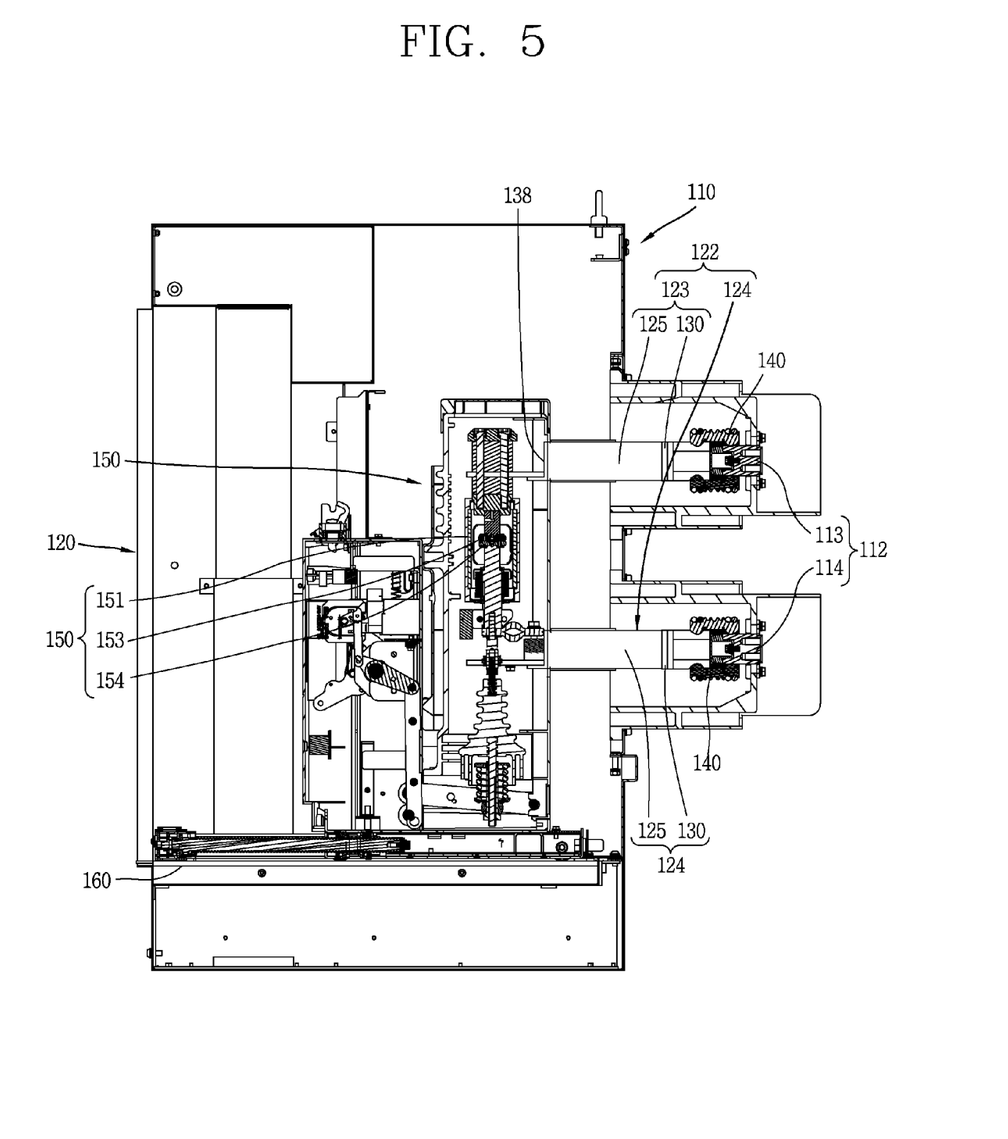
FIG. 5 is a sectional view showing a connected position of a circuit breaker in accordance with one exemplary embodiment of the present disclosure.
Figure 6:
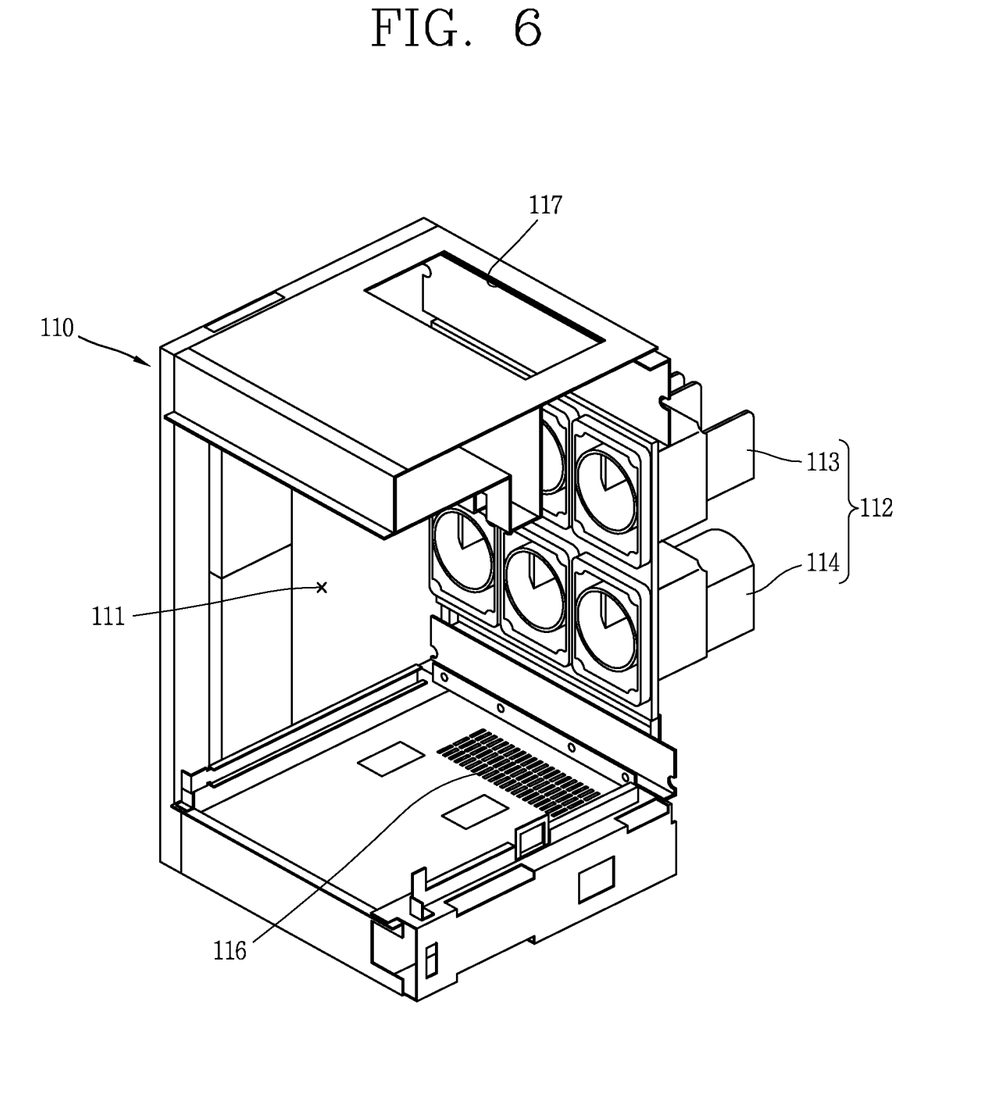
FIG. 6 is a perspective view showing an inside of a cradle shown in FIG. 5.
Figure 7:
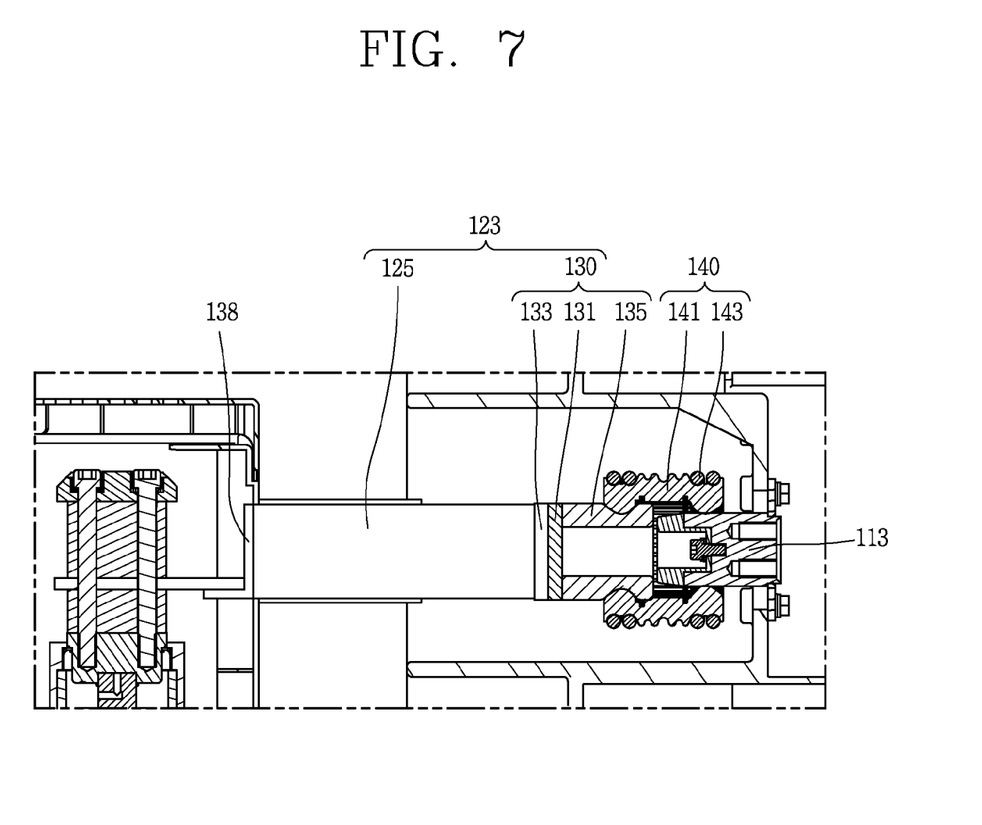
FIG. 7 is an enlarged view showing a main part shown in FIG. 5.

As shown in FIGS. 5 to 7, a circuit breaker according to one exemplary embodiment may include a cradle 110 having a plurality of terminals 112, and a breaker main body 120 having a plurality of terminal connectors 112 and a plurality of vacuum interrupters 150 connected to the terminals 112, respectively, and movable between a connected position where the terminal connectors 122 are connected to the terminals 112 and a disconnected position where the terminal connectors 122 are separated from the terminals 112. Each of the terminal connectors 122 may include a plurality of segment conductors 125 each having one end connected to the vacuum interrupter 150 and the other end facing the terminal 112, and contact members 140 connected to the other end of the respective segment conductors 125 to allow for a flow of current and contactable with the respective terminals 112 at the connected position of the breaker main body 120.

The cradle 110 may include an accommodating space 111 in which the breaker main body 120 is accommodated.

The plurality of terminals 112 connected to a bus side and a load side may be disposed at a rear area of the cradle 10.

For example, the terminals 112 may be provided for each phase (U-phase, V-phase, W-phase) of an electric power source, and the phase-based terminals 112 may be spaced apart from one another. The terminals 112, for example, may be spaced from one another in a horizontal direction for each phase.

Each phase-based terminal 112 may include an upper terminal 113 and a lower terminal 114 which are spaced from each other in up and down directions so as to be connectable with a bus and a load for each phase of the electric power source. For example, each upper terminal 113 may be connected to the bus and each lower terminal 114 may be connected to the load.

The cradle 110 may include an air inlet 116 through which air is introduced into the accommodating space 111, and an air outlet through which air is discharged out of the cradle 110.

For example, the air inlet 116 may be located on a lower portion of the cradle 110.

The air outlet 117 may be formed on an upper area of the cradle 110.

In more detail, the air inlet 116 may be placed lower than each terminal 112, and the air outlet 117 may be placed higher than each terminal 112. This may facilitate for an air flow (introduction and discharge) by virtue of a current convection, resulting in facilitation of heat radiation (cooling) of each terminal connector 122.

In the meantime, the breaker main body 120 may include the plurality of terminal connectors 122 connectable with the terminals 112 of the cradle 110, respectively.

The breaker main body 120 may be movable between a connected position where the terminal connector 122 is connected to the terminal 112 and a disconnected position where the terminal connector 122 is separated (disconnected) from the terminal 112.

A conveyer 160 for movably supporting the breaker main body 120 may be disposed beneath the breaker main body 120.

Figure 9:
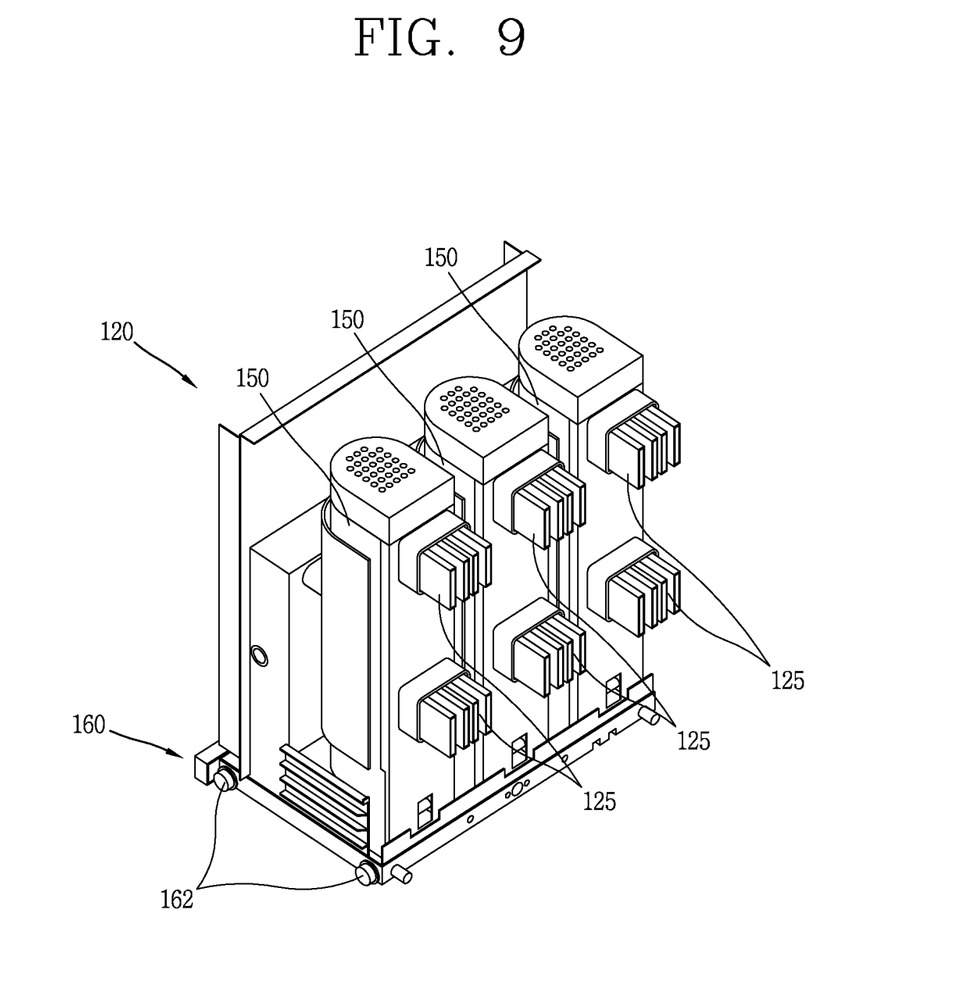
FIG. 9 is a cut-off perspective view taken along the line IX-IX of FIG. 8.

The conveyer 160, as shown in FIG. 9, may include a plurality of wheels which are rollable on a lower portion of the cradle 110. Accordingly, the conveyer 160 may be smoothly movable.

Each of the terminal connectors 122 of the breaker main body 120 may include an upper terminal connector 123 and a lower terminal connector 124 corresponding to the upper terminal 113 and the lower terminal 114 and disposed with being spaced from each other in up and down directions.

A vacuum interrupter 150 for opening and closing a main circuit power source may be located between the upper terminal connector 123 and the lower terminal connector 124 for each phase.

The vacuum interrupter 150 may include a vacuum container 151 defining an inner vacuum space, a fixed contactor 153 fixed to one side of the vacuum container 151, and a movable contactor 154 disposed to be contactable with and separated from the fixed contactor 153.

The upper terminal connector 123 and the lower terminal connector 124 may be provided for each phase and spaced apart from each other in a widthwise direction.

Each of the terminal connectors 122 may include a plurality of segment conductors 125 each having one end connected to the vacuum container 150 and the other end facing the terminal 112, and a contact member 140 connected to the other end of each segment conductor 125 for allowing a flow of current and contactable with the terminal 112 at the connected position of the breaker main body 120.

This exemplary embodiment illustrates four segment conductors 125. Here, the number of segment conductors 125 may be appropriately adjusted. Also, thickness and length of each segment conductor 125 may be appropriately adjusted.

Figure 8:
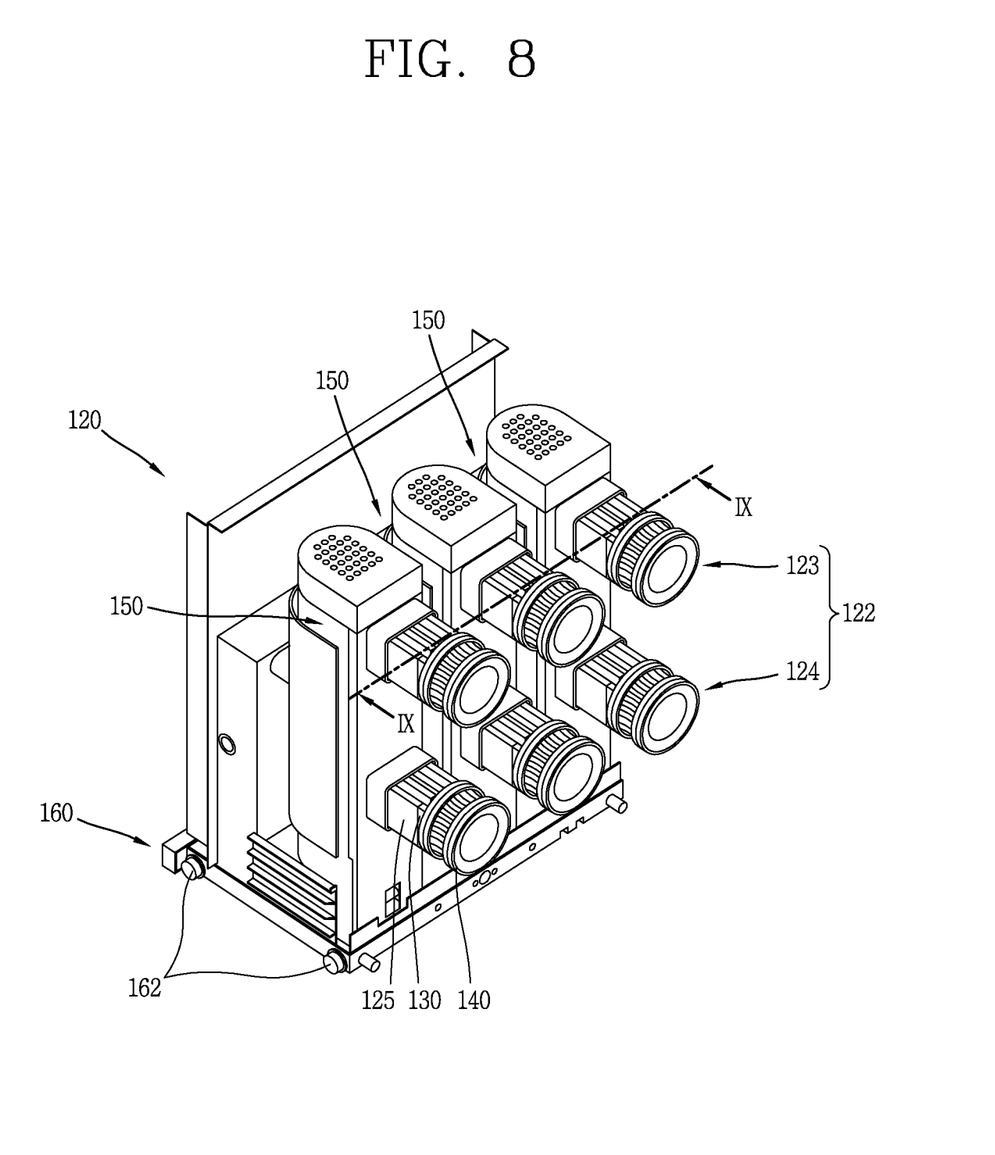
FIG. 8 is a perspective view of a breaker main body shown in FIG. 5.

Each segment conductor 125, as shown in FIGS. 8 and 9, for example, may have a section (a rectangular section) which is long in up and down directions. The segment conductors 125 may be spaced apart from one another in a widthwise direction thereof. This structure may increase a surface area of each segment conductor 125 so as to increase an amount of heat radiated (i.e., an amount of heat exchanged). Consequently, cooling of each segment conductor 125 may be facilitated.

Also, a current convection may facilitate the air flow and the heat exchange, accordingly, the cooling may be further promoted. That is, as the terminal connector 122 according to this exemplary embodiment uses the segment conductor 125, an amount of radiated heat of the conductor may increase by virtue of an increase in an overall surface area of the conductor, without an increase in an overall amount of copper used. Also, as each segment conductor 125 has a section which is vertically long (long length or height), the air flow may be facilitated by virtue of the current convection, thereby further increasing the amount of heat exchanged (i.e., the amount of heat radiated).

The exemplary embodiment illustrates that each segment conductor 125 has a rectangular section, but the segment conductor 125 may also be configured to have an elliptic shape which is vertically long.

Each terminal connector 122 may include a coupling conductor 130 simultaneously connected to the other end of each segment conductor 125. The contact member 140 may be coupled to a periphery of the coupling conductor 130.

A connection conductor 138 may be connected to an end portion of the vacuum interrupter 150 of each segment conductor 125. The connection conductor 138 may have one end connected to the fixed contactor 153 or the movable contactor 154 of the vacuum interrupter 150.

The connection conductor 138, for example, may be implemented as a conductor having a shape of a rectangular plate which is simultaneously contactable with each segment conductor 125.

Each contact member 150 may include a plurality of fingers 141 radially disposed on the same circumference, and spring members 143 coupled to an outer surface of each finger 141 to inwardly press the fingers 141. The contact member 140 may be implemented as a so-called tulip contactor.

Each coupling conductor 130 may be provided with a contact member coupling portion 135 coupled with the contact member 140. The contact member coupling portion 135 may have an annular shape.

Figure 10:
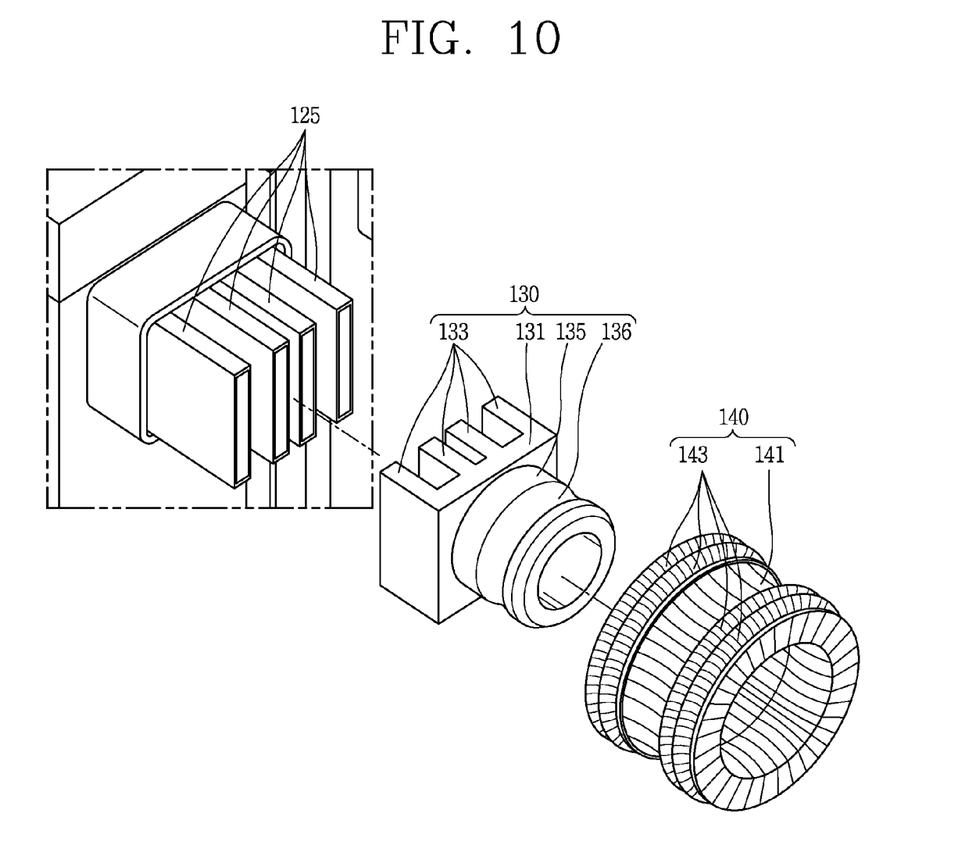
FIG. 10 is a perspective view showing a state before coupling a coupling conductor of FIG. 8.

The coupling conductor 130, for example, as shown in FIG. 10, may include a body 131, and a plurality of coupling portions 133 formed on one side of the body 131 to be coupled to end portions of the respective segment conductors 125.

Each coupling portion 133, for example, may have a rectangular section, which has the same shape and size as those of each segment conductor 125.

The contact member coupling portion 135 having the annular shape may be formed at the other side of the body 131 such that the contact member 140 can be coupled thereto. This may facilitate for coupling of the contact member 140 without a structural change of the contact member 140.

Figure 11:
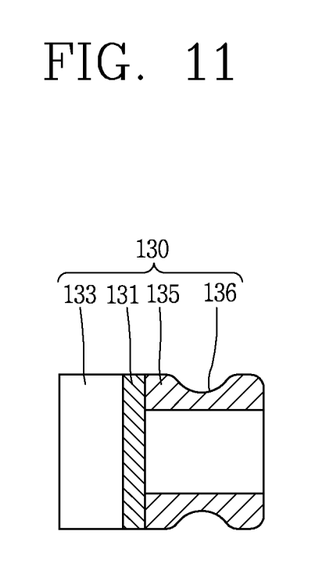
FIG. 11 is a longitudinal sectional view of the coupling conductor of FIG. 10.

The contact member coupling portion 135, for example, as shown in FIGS. 10 and 11, may have the annular shape which protrudes from the surface of the body 131 toward the terminal 112 and whose outer surface is contactable with an outer surface of the contact member 140.

A recess 136 may be recessed into an outer surface of the contact member coupling portion 135 in a radial direction so as to correspond to the shape of the contact member 140 (in more detail, a shape of an inner surface of each finger 141 of the contact member 140). This may allow a coupled (contact) state between the contact member coupling portion 135 and the contact member 140 to be stably maintained.

With the configuration, when the breaker main body 120 is moved to the connected position, the end portion of each terminal 112 may be connected to the terminal connector 122.

In more detail, when the breaker main body 120 is moved to the connected position, the end portion of the terminal 112 may be inserted into the contact member 140 of each terminal connector 122 by a predetermined depth. Here, the movable contactor 154 of the vacuum interrupter 150 may come in contact with the fixed contactor 153 such that a current can flow. Accordingly, the bus side and the load side connected to each terminal 112 of the cradle 110 may be connected to each other such that the current can flow.

In the meantime, as each of the terminal connectors 122 according to this exemplary embodiment includes the plurality of segment conductors 125, the surface area of the conductor may increase without an increase in an amount of copper used. This may result in an increase of an amount of heat radiated (an amounted of heat exchanged with air) of the conductor while the current flows, facilitating cooling of the conductor. Also, each segment conductor 125 may be disposed such that its section can be long in up and down directions. This may improve the air flow by virtue of the current convection, resulting in further improving the heat exchange.

Also, in the circuit breaker according to the exemplary embodiment, while the current flows, air whose temperature has increased in response to the heat exchange with each segment conductor 125 may be discharged to the outside through an air outlet 117, which is formed above each terminal 112, by virtue of the current convection and simultaneously external air whose temperature is relatively low may be introduced through an air inlet 116, which is formed below each terminal 112. This may further facilitate the heat exchange of each segment conductor 125, thereby further cooling each terminal connector 122.

As described above, in accordance with one exemplary embodiment, each terminal connector may include a plurality of segment conductors. This may increase an amount of heat radiated without an increase in an amount of copper used, which may result in facilitating cooling of the terminal connector.

An amount of exchanged heat of the terminal connector may increase without an increase in a fabricating cost and an installation cost.

With formation of a contact member coupling portion for allowing the contact member to be coupled to a coupling conductor, the installation (or mounting) of the contact member can be facilitated without a structural change of the contact member (tulip contactor).

Also, the segment conductors may be spaced apart from one another in a widthwise direction, with a section having a vertical length longer than a horizontal width, facilitating cooling of the segment conductor.

In addition, with a cradle having an air outlet above terminals and an air inlet below the terminals, cooling of the terminals and the terminal connectors can be facilitated.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A circuit breaker comprising:
a cradle having an accommodation space therein and a plurality of terminals; and
a breaker main body having a plurality of terminal connectors and a plurality of vacuum interrupters, each of the plurality of terminal connectors contactable with one the plurality of terminals and each of the plurality of vacuum interrupters connected to one of the plurality of terminal connectors the breaker main body installed within the cradle such that the breaker main body is movable between a connected position in which the plurality of terminal connectors are connected to the plurality of terminals and a disconnected position in which the plurality of terminal connectors are separated from the plurality of terminals,
wherein each of the plurality of terminal connectors comprises:
a plurality of segment conductors each having one end connected to the corresponding vacuum interrupter and the other end facing the corresponding terminal;
a contact member connected to the other end of each of the plurality of segment conductors to allow for current flow and connected to the corresponding terminal at a connected position of the breaker main body; and
a coupling conductor simultaneously coupled to the other end of the plurality of segment conductors and having a periphery coupled with the contact member, and
wherein each coupling conductor comprises a body and a plurality of coupling portions formed on one side of the body for connection to an end portion of each of the plurality of corresponding segment conductors.

2. The circuit breaker of claim 1, wherein each coupling conductor comprises a contact member coupling portion to allow the corresponding contact member to be coupled to the other side of the coupling conductor body.

3. The circuit breaker of claim 2, wherein each contact member coupling portion has a circular section.

4. The circuit breaker of claim 3, wherein each contact member coupling portion is provided with a recess in a radial direction of the contact member coupling portion and extending along a circumferential direction of the contact member coupling portion.

5. The circuit breaker of claim 1, further comprising a connection conductor located between each of the plurality of vacuum interrupters and the corresponding plurality of segment conductors.

6. The circuit breaker of claim 5, wherein each connection conductor is formed in a shape of plate such that it may simultaneously contact each of the corresponding plurality of segment conductors.

7. The circuit breaker of claim 1, wherein each of the plurality of segment conductors is located such that a section of the segment conductor has a vertical length greater than a horizontal width.

8. The circuit breaker of claim 7, wherein the plurality of segment conductors are spaced from each other in the horizontal widthwise direction such that air flows through the plurality of segment conductors.

9. The circuit breaker of claim 1, wherein the cradle further has an air outlet through which air within the cradle is discharged.

10. The circuit breaker of claim 9, wherein the air outlet is located above the plurality of terminals.

11. The circuit breaker of claim 1, wherein the cradle further has an air inlet through which air is introduced.

12. The circuit breaker of claim 11, wherein the air inlet is located below the plurality of terminals.

13. The circuit breaker of claim 1, wherein the cradle further has:
- an air outlet located above the plurality of terminals and through which air within the accommodation space is discharged; and
- an air inlet located below the plurality of terminals and through which air is introduced into the accommodation space.

14. A circuit breaker comprising:
- a cradle having an accommodation space therein and a plurality of terminals; and
- a breaker main body having a plurality of terminal connectors and a plurality of vacuum interrupters, each of the plurality of terminal connectors contactable with one of the plurality of terminals and each of the plurality of vacuum interrupters connected to one of the plurality of terminal connectors, the breaker main body installed within the cradle such that the breaker main body is movable between a connected position in which the plurality of terminal connectors are connected to the plurality of terminals and a disconnected position in which the plurality of terminal connectors are separated from the plurality of terminals, wherein each of the plurality of terminal connectors comprises:
- a plurality of segment conductors each having one end connected to the corresponding vacuum interrupter and the other end facing the corresponding terminal;
- a contact member connected to the other end of each of the plurality of segment conductors to allow for current flow and connected to the corresponding terminal at a connected position of the breaker main body; and
- a coupling conductor simultaneously coupled to the other end of the plurality of segment conductors and having a periphery coupled with the contact member, and wherein each coupling conductor comprises a body and a plurality of coupling portions formed on one side of the body for connection to an end portion of each of the plurality of corresponding segment conductors.

* * * * *